(12) United States Patent  
Waterhouse et al.

(10) Patent No.: US 7,552,356 B1
(45) Date of Patent: Jun. 23, 2009

(54) DISTRIBUTED DATA STORAGE SYSTEM FOR FIXED CONTENT

(75) Inventors: Steven Richard Waterhouse, San Francisco, CA (US); Yaroslav Faybishenko, San Francisco, CA (US); Sherif M. Botros, Redwood Shores, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 758 days.

(21) Appl. No.: 10/964,411

(22) Filed: Oct. 12, 2004
(Under 37 CFR 1.47)

Related U.S. Application Data

(60) Provisional application No. 60/584,656, filed on Jun. 30, 2004.

(51) Int. Cl.
*G06F 11/00* (2006.01)
(52) U.S. Cl. ............................................. 714/6; 714/4
(58) Field of Classification Search ............... 714/6, 714/4
See application file for complete search history.

(56) References Cited

U.S. PATENT DOCUMENTS

| | | | |
|---|---|---|---|
| 5,640,286 A | 6/1997 | Acosta et al. | 360/48 |
| 5,689,727 A | 11/1997 | Bonke et al. | 710/20 |
| 6,108,703 A | 8/2000 | Leighton et al. | 709/226 |
| 6,182,121 B1 | 1/2001 | Wlaschin | 709/215 |
| 6,185,601 B1 | 2/2001 | Wolff | 709/203 |
| 6,230,200 B1 | 5/2001 | Forecast et al. | 709/226 |
| 6,252,878 B1 | 6/2001 | Locklear, Jr. et al. | 370/401 |
| 6,262,976 B1 | 7/2001 | McNamara | 370/254 |
| 6,272,136 B1 | 8/2001 | Lin et al. | 370/392 |
| 6,272,522 B1 | 8/2001 | Lin et al. | 709/200 |
| 6,295,564 B1 | 9/2001 | Shigetomi et al. | 710/74 |
| 6,424,621 B1 | 7/2002 | Ramaswamy et al. | 370/230 |
| 6,496,883 B2 | 12/2002 | Shigetomi et al. | 710/74 |
| 6,557,076 B1 | 4/2003 | Copeland et al. | 711/744 |
| 6,567,905 B2 | 5/2003 | Otis | 711/170 |
| 6,725,392 B1 * | 4/2004 | Frey et al. | 714/6 |
| 6,742,137 B1 * | 5/2004 | Frey, Jr. | 714/6 |
| 6,862,692 B2 | 3/2005 | Ulrich et al. | 714/6 |
| 6,865,655 B1 * | 3/2005 | Andersen | 711/162 |
| 6,968,479 B2 | 11/2005 | Wyatt et al. | 714/53 |

(Continued)

OTHER PUBLICATIONS 192.168.1.100 (About.com)—http://compnetworking.about.com/od/workingwithpaddresses/g/192_168_1_100_d.htm.*

(Continued)

*Primary Examiner*—Yolanda L Wilson
(74) *Attorney, Agent, or Firm*—Gunnison, McKay & Hodgson, L.L.P.; Philip J. McKay

(57) ABSTRACT

In accordance with the invention, a data storage system for fixed content includes one or more peer node computer systems interconnected by a storage system network, where each peer node computer system includes a symmetric storage system application and locally attached storage. A data object is distributively stored on one or more of the one or more peer node computer systems and identified using a unique object identifier. A data object is flexibly stored on the data storage system according to external criteria. Stored data objects are accessible from any of the one or more peer node computer systems. Applications can be executed on the data storage system using data objects that are stored on, being written to, or being read from the data storage system to generate results accessible by a user.

32 Claims, 6 Drawing Sheets

U.S. PATENT DOCUMENTS

| | | | | |
|---|---|---|---|---|
| 6,996,501 | B1 | 2/2006 | Rothberg | 702/186 |
| 7,024,582 | B2* | 4/2006 | Loy et al. | 714/4 |
| 7,117,201 | B2 | 10/2006 | Kuno et al. | 707/3 |
| 7,155,464 | B2 | 12/2006 | Belov | 707/204 |
| 7,162,575 | B2 | 1/2007 | Dalal et al. | 711/112 |
| 7,203,871 | B2 | 4/2007 | Turner et al. | 714/710 |
| 7,266,716 | B2 | 9/2007 | Frolund et al. | 714/6 |
| 7,272,613 | B2* | 9/2007 | Sim et al. | 707/102 |
| 7,287,180 | B1* | 10/2007 | Chen et al. | 714/4 |
| 7,296,180 | B1 | 11/2007 | Waterhouse et al. | 714/6 |
| 7,328,303 | B1 | 2/2008 | Waterhouse et al. | 711/112 |
| 2002/0133491 | A1 | 9/2002 | Sim et al. | 707/10 |
| 2002/0152310 | A1 | 10/2002 | Jain et al. | 709/226 |
| 2002/0166026 | A1 | 11/2002 | Ulrich et al. | 711/114 |
| 2003/0009563 | A1 | 1/2003 | Douglis et al. | 709/227 |
| 2003/0078996 | A1* | 4/2003 | Baldwin | 709/220 |
| 2003/0188097 | A1 | 10/2003 | Holland et al. | 711/114 |
| 2003/0237016 | A1* | 12/2003 | Johnson et al. | 714/4 |
| 2004/0003055 | A1 | 1/2004 | Holland et al. | 709/219 |
| 2004/0073582 | A1 | 4/2004 | Spiegel | 707/204 |
| 2004/0205110 | A1 | 10/2004 | Hinshaw | 709/201 |
| 2005/0108594 | A1 | 5/2005 | Menon et al. | 714/6 |
| 2005/0165662 | A1 | 7/2005 | Shigetomi et al. | 705/27 |
| 2005/0257083 | A1* | 11/2005 | Cousins | 714/6 |
| 2005/0273686 | A1 | 12/2005 | Turner et al. | 714/752 |
| 2005/0283645 | A1 | 12/2005 | Turner et al. | 714/4 |

OTHER PUBLICATIONS

"How to configure the MultiNICA and IPMultiNIC agents" http://seer.support.veritas.com/docs/231480.htm.*

SHA—Secure Hash Algorithm www.foldoc.org/?SHA.*

U.S. Appl. No. 10/883,321, filed Jun. 30, 2004, entitled "Method for Load Spreading of Requests in a Distributed Data Storage System" of Olaf Manczak et al., 52 pp.

U.S. Appl. No. 10/883,325, filed Jun. 30, 2004, entitled "Method for Distributed Storage of Data" of Steven Richard Waterhouse et al., 68 pp.

U.S. Appl. No. 10/883,334, filed Jun. 30, 2004, entitled "Network Switch Having an Updatable Load Spreading Configuration" of Olaf Manczak et al., 51 pp.

Anderson et al., "Robust Distributed Storage Using Erasure Codes", Dec. 5, 2002, pp. 1-10 [online]. Retrieved from the Internet: <URL:http://pdos.csail.mit.edu/6.824-2002/projects/erasure.ps>.

Cohen et al., "Segmented Information Dispersal (SID) Data Layouts for Digital Video Servers", *IEEE Transactions on Knowledge and Data Engineering*, Jul./Aug. 2001, pp. 593-606, vol. 13, No. 4.

* cited by examiner

DISTRIBUTED DATA STORAGE SYSTEM FOR FIXED CONTENT

This application claims the benefit of U.S. Provisional Application No. 60/584,656, filed Jun. 30, 2004.

BACKGROUND OF THE INVENTION

1. Field of the Invention

The present invention is directed to the field of data storage. In particular, the present invention is directed to the distributed storage of fixed content.

2. Description of Related Art

The quantity of fixed data content, such as text files and image files, is rising rapidly. For example, the Internet Archive WayBack Machine (www.archive.org) currently archives 30 billion web pages.

Further, compliance with stricter government regulations is requiring the storage of large amounts of selected data, such as securities and medical data, together with procedures for timely and verifiable retrieval of this data from the data storage system.

Due to rapidly increasing processor performance and disk storage size, data is increasingly stored on computer-based data storage systems, and, particularly, disk drives. However, while the storage capacity on disk drives has progressed rapidly, the ability to locate, access, and retrieve selected data has not progressed at the same rate. In particular, once selected data is located in a data storage system, the retrieval of the data is still limited by the performance of the disk head to write or read the data to or from the disk, as well as the bandwidth of the communication channels used to transfer the data into or out of the data storage system.

Prior art data storage systems primarily based the reliability of the data storage system on the hardware utilized by the system. Thus, many prior art storage systems often used highly configured data storage systems with costly hardware and inflexible architectures to attempt to manage the storage and retrieval of data in large data storage systems. If a component failed, a system administrator was often immediately notified to repair or replace the component to prevent failure of the system. Consequently, one or more system administrators were sometimes needed to maintain the hardware, and thus the reliability of the data storage system, or other level of quality of service.

Additionally, most prior art data storage systems permitted modification of data stored on the data storage system. Thus, to maintain coherent data, these prior art data storage systems often utilized lock managers that prevented concurrent modification of stored data. Disadvantageously, the lock managers often became a bottleneck in the data storage system.

Further, if a user desired to execute an application using data stored on a prior art data storage system, the data had to be located on the data storage system, transferred from the data storage system to the user's system, and then the application could be executed using the transferred data on the user's system. Where large amounts of data were requested, data transfer was often a lengthy process due to bandwidth limitations of the communications channels used to transfer the data. Additionally, once the user received the data, the user was limited to the processing capabilities of their computer system.

SUMMARY OF THE INVENTION

In accordance with the invention, a data storage system for storing and retrieving fixed data content includes: a storage system network; and one or more peer node computer systems interconnected by the storage system network. Each of the one or more peer node computer systems includes a symmetric storage system application, and locally attached storage connected to the symmetric storage system application. Data stored on the data storage system are accessible from any of the one or more peer node computer systems.

Data is stored on the data storage system as one or more data objects. Each data object is identified on the data storage system using a unique object identifier based on an intrinsic property of the data object, such as the content of the data object, thus providing content addressability. Once stored, a data object is not modifiable.

A data object is distributively stored on the data storage system in accordance with a layout map associated with the data object.

A data object is distributively stored in a flexible manner on the one or more peer node computer systems according to external criteria, such as a desired reliability of storage.

Metadata associated with the data object is generated during storage of the data object, and at least a portion of the metadata is distributively stored with the data object. Metadata received from other sources are also distributively stored on the data storage system and used in search and retrieval of a data object on the data storage system.

The data storage system permits distributed and balanced recovery of data objects in which the storage reliability of a data object is maintained. Each peer node computer system in the data storage system can independently start a recovery process to reconstruct data stored on a failed peer node computer system or on a locally attached storage device.

Applications, termed disklets, can be uploaded to and executed on the data storage system permitting the application to be executed using data objects that are stored on, being written to, or being read from the data storage system to generate results accessible by a user. Thus, an application can be executed on the same data storage system that the data is stored on.

BRIEF DESCRIPTION OF THE DRAWINGS

The accompanying drawings, which are incorporated in, and constitute a part of this specification, illustrate embodiments of the invention, and together with the description, serve to explain the invention. In the drawings, the same reference numbers are used to denote similar components in the various embodiments.

In the drawings.

DETAILED DESCRIPTION

The invention will now be described in reference to the accompanying drawings. The same reference numbers may be used throughout the drawings and the following description to refer to the same or like parts.

Figure 1:
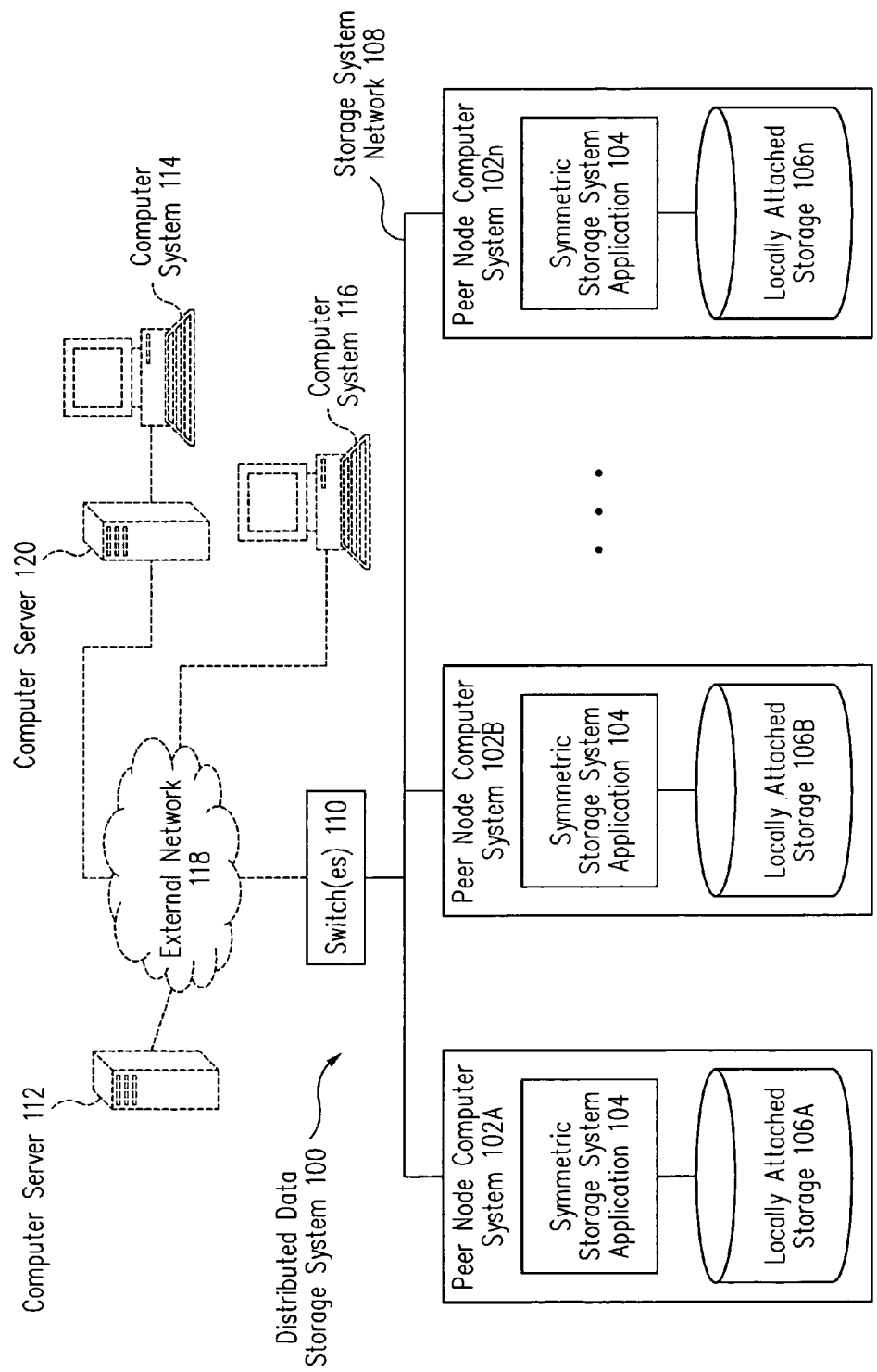
FIG. 1 illustrates a diagram of a distributed data storage system in accordance with one embodiment of the invention.

FIG. 1 illustrates a diagram of a distributed data storage system 100 in accordance with one embodiment of the invention. As illustrated, in one embodiment, distributed data storage system 100, hereinafter referred to as storage system 100, includes a plurality of peer node computer systems 102A-102n, hereinafter referred to as nodes 102A-102n, interconnected by a storage system network 108. In one embodiment, each node 102A-102n includes a network protocol interface that allows data objects to be stored, retrieved, and operated on in storage system 100 through any of nodes 102A-102n. Further, in one embodiment, each node 102A-102n is assigned a different IP address.

In the present embodiment, each node 102A-102n includes a symmetric storage system application 104 connected to locally attached storage 106A-106n, respectively. For example symmetric storage system application 104 is connected to locally attached storage 106A in node 102A. In storage system 100, symmetric storage system application 104 is symmetric, i.e., the same, across all of nodes 102A-102n, however, the hardware components that make up each node 102A-102n, for example, locally attached storage 106A, need not be symmetric.

Each node 102A-102n is a complete compute and storage unit and includes all the software required to run storage system 100. In one embodiment, the group of one or more nodes 102A-102n, for example, sixteen nodes, are termed a cell, and management of the cell is by any of nodes 102A-102n (at any one time), herein termed a master node. In one embodiment, selection of a master node is determined using an election process. Election processes are well known to those of skill in the art and are not further described herein for clarity of description of the present invention.

In one embodiment, each node 102A-102n provides status information over storage system network 108 that is received by the other nodes and used to build and maintain individual views of the cell, herein termed a cell view. In one embodiment, a cell view includes information about whether a node 102A-102n is active and available for storage of data and about which node 102A-102n is the master node. In other embodiments, the status information provided by each node 102A-102n and the cell view includes additional information, such as the availability of individual storage structures in each locally attached storage 106A-106n, and data storage levels of each locally attached storage 106A-106n.

When a node failure is detected in the cell view, each affected node 102A-102n in storage system 100 independently starts a recovery process to reconstruct data stored on the failed node or on a locally attached storage allowing distributed and balanced recovery of data in which the storage reliability of a data object is maintained.

In FIG. 1, some of nodes 102A-102n can be active and available, herein termed on-line, while some others of nodes 102A-102n may not be actively available, herein termed off-line. Any of nodes 102A-102n can be selectively brought on-line or taken off-line in storage system 100 as needed. In the present description, a node 102A-102n is assumed to be on-line and available unless otherwise specified.

In one embodiment, each of nodes 102A-102n is a field replaceable unit (FRU). In one embodiment, when a new node is added to storage system 100, the new node is automatically recognized by storage system 100 and any needed applications, such as symmetric storage system application 104, is automatically loaded on to the new node from one of nodes 102A-102n. The new node is then registered with storage system 100, any needed formatting is performed, and any data transfer to the new node occurs.

Data is stored on storage system 100 as data objects. Herein a data object is data of a finite length that is separately identifiable from other data objects and is transferable to storage system 100, for example, a text file, an image file, or a program file, among others. In one embodiment, a layout map ID is generated and associated with a data object. The layout map ID is used to generate a layout map for distributed placement of the data object on storage system 100. A unique object identifier (ID) is generated based on an intrinsic property of the data object, such as the content of the data object, which identifies the data object and provides content addressability for the data object. The data object is divided into data fragments to permit distributed placement of the data object on storage system 100.

During fragmentation of a data object, parity fragments are also generated in accordance with external criteria, such as a desired reliability of storage. The data fragments and the parity fragments are distributively stored on storage system 100 in accordance with the layout map and associated with the unique object ID.

System metadata is also generated during fragmentation of a data object, and at least a portion of this system metadata is stored with each data fragment and parity fragment and is used to reconstruct the data object. Metadata generated from other sources, termed extended metadata, can also be associated with a data object. Thus, although a data object has a single object ID, several metadata can be associated with the object ID.

In one embodiment, a unique metadata object identifier (ID) is generated for each metadata associated with a data object. In one embodiment, selected metadata are indexed and stored in one or more metadata caches to provide enhanced searching and retrieval of data objects on storage system 100. In one embodiment, storage system 100 includes mechanisms for uploading an application, herein termed a disklet, onto storage system 100 and executing the disklet on storage system 100 using data objects that are being written to, being read from, or are stored on storage system 100.

In the present embodiment, access to storage system 100, and, in particular, to nodes 102A-102n, is via a switch 110. In some embodiments, one or more switches 110 are utilized, for example, to provide redundancy or back-up in the event of failure of a switch 110.

In one embodiment, switch 110 is configured to support communications on two networks: an external network for external traffic between storage system 100 and external clients, such as computer servers 112 and 120, and computer system 116 on external network 118; and an internal network, i.e., storage system network 108, for internal traffic between nodes 102A-102n.

In one embodiment, switch 110 is configured to present two IP addresses to the external network: a virtual IP address for client access to storage system 100; and, an administrative IP address used to access both switch 110 and a node 102A-102n designated as the master node. The administrative IP address is further used to permit administration of storage system 100, such as by a system administrator, for example on computer system 114. In this embodiment, although each of nodes 102A-102n has an associated IP address, nodes 102A-102n are abstracted from clients on the external network, allowing nodes 102A-102n, to be viewed as a single entity.

Requests, such as store and retrieve requests, received by switch 110 are sent to a node 102A-102n in storage system 100 using a load spreading mechanism, such as according to a switching table utilized by switch 110. In one embodiment, the switching table is periodically updated, e.g., reconfigured, by one or more of nodes 102A-102n to dynamically effect a desired load spreading on storage system 100.

In an alternative embodiment, rather than switch 110 presenting a single IP address to external clients, each node 102A-102n presents its assigned IP address to the external network via switch 110, and, rather than load spreading occurring at switch 110, a basic load spreading mechanism is included with a client API (resident at the client) in order to spread the load among nodes 102A-102n. In one embodiment, a listing of nodes 102A-102n is passed to the client API in order to effect the load spreading.

Figure 2:
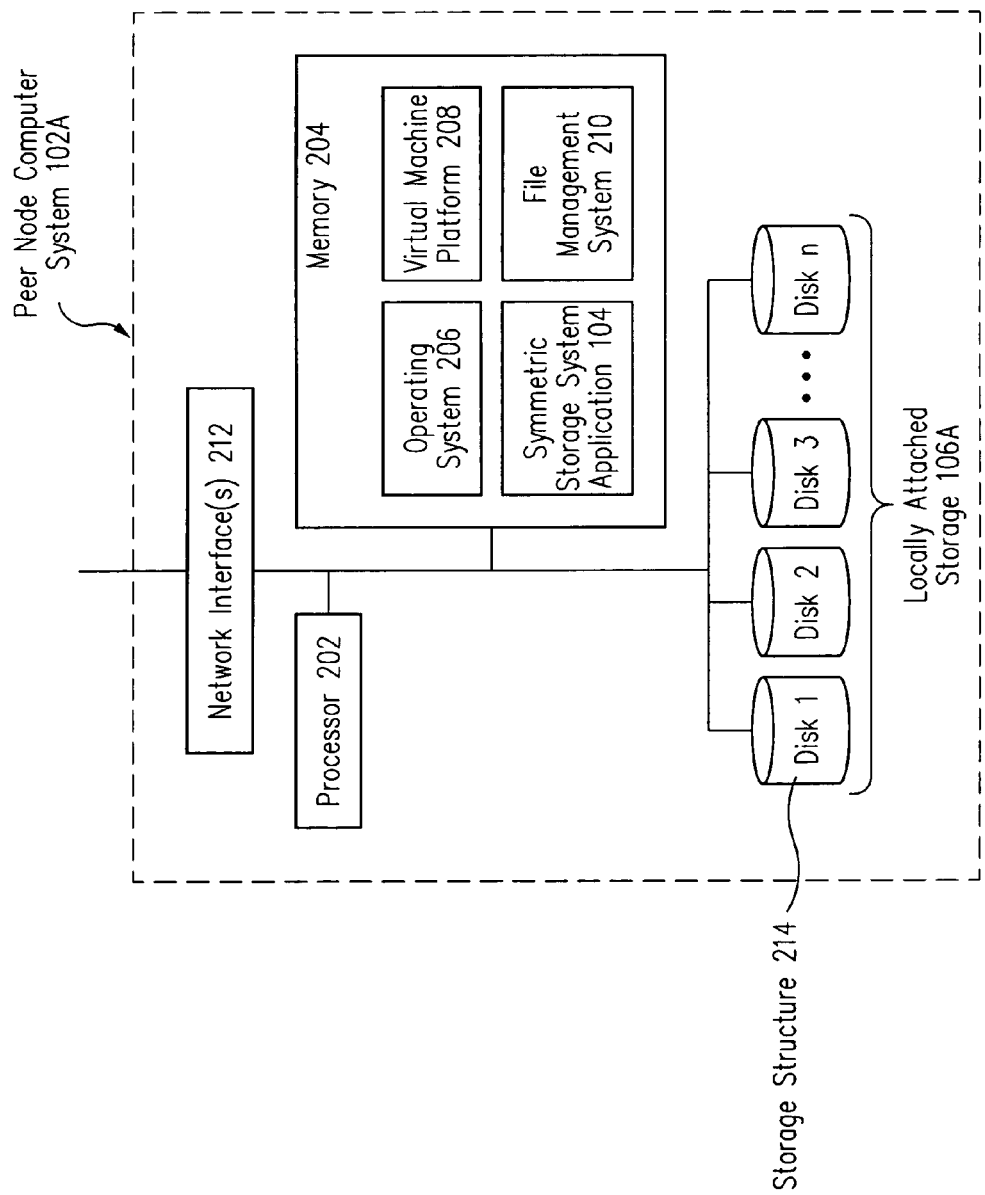
FIG. 2 illustrates one example of a peer node computer system in accordance with one embodiment of the invention.

FIG. 2 illustrates one example of peer node computer system 102A in accordance with one embodiment of the invention. Although the present embodiment is described with reference to peer node computer system 102A, herein node 102A, the description is applicable to any of nodes 102A-102n. It is to be understood that the present example is exemplary, and that other configurations and hardware are possible, in particular, locally attached storage 106A can be formed of fewer or greater numbers of storage structures, e.g., disk 1-disk n, and with individually different storage capacities.

In FIG. 2, in one embodiment, node 102A includes one or more network interface(s) 212 which provide connectivity to network 108 (including switch(es) 110). In embodiments where one or more switch(es) 110 are present in storage system 100, one or more corresponding network interface(s) 212 can be utilized on node 102A.

In the present embodiment, node 102A further includes: a processor 202; a memory 204; an operating system 206; a virtual machine platform 208; a file management system 210; symmetric storage system application 104; and locally attached storage 106A. In one embodiment, locally attached storage 106A includes one or more storage structures 214, such as a finite number of disks 1-n, for example, four disks.

In the present embodiment, node 102A is organized to be an ergonomically acceptable field replaceable unit (FRU), for example, in one embodiment, a 1U form factor FRU.

Figure 3:
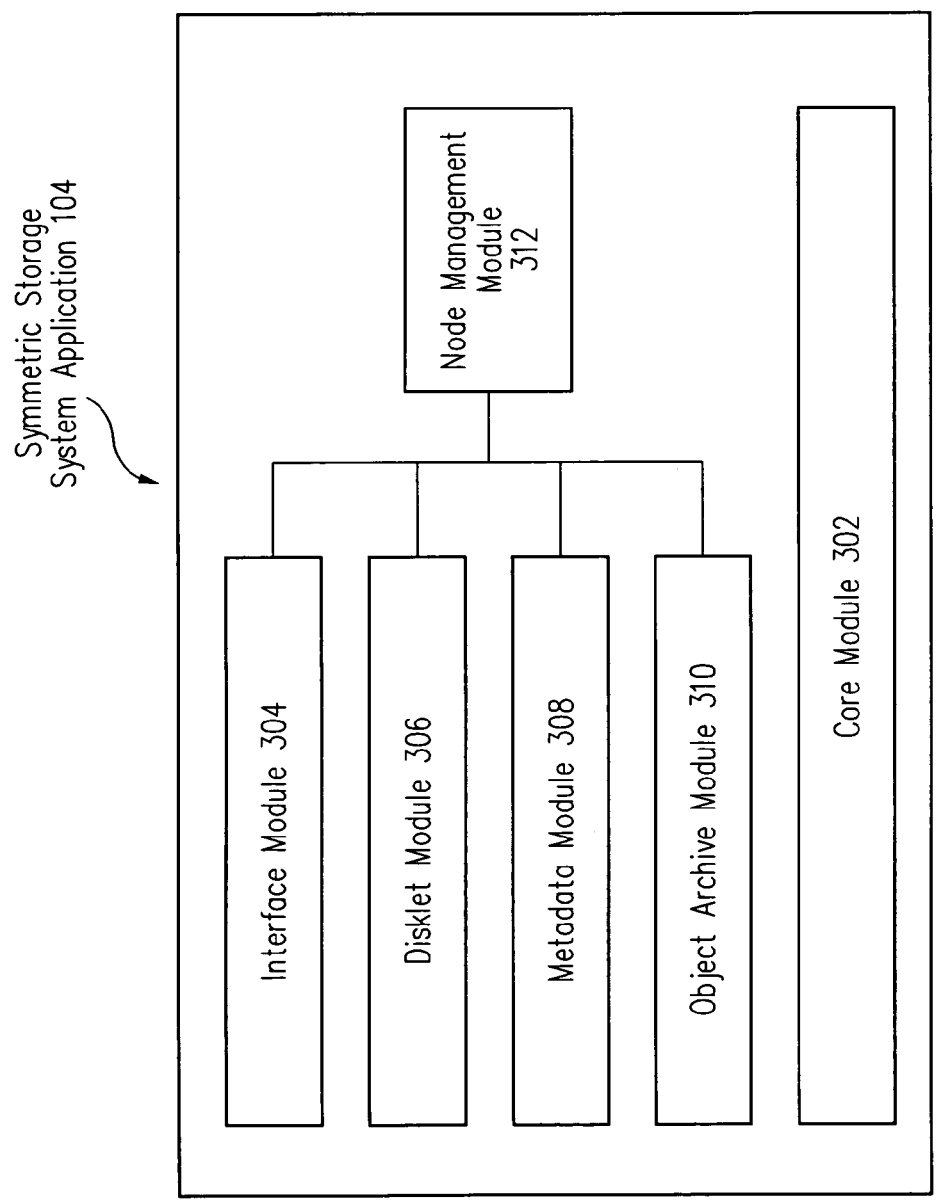
FIG. 3 illustrates a functional block diagram of a symmetric storage system application in accordance with one embodiment of the invention.

FIG. 3 illustrates a functional block diagram of symmetric storage system application 104 of node 102A in accordance with one embodiment of the invention. As illustrated in FIG. 3, in one embodiment, symmetric storage system application 104 includes: a core module 302; an interface module 304; a disklet module 306; a metadata module 308; an object archive module 310; and, a node management module 312.

In one embodiment, node management module 312 controls modules 302, 304, 306, 308, and 310 of symmetric storage system application 104, and, controls storage system 100 in instances when node 102A is the master node. Node management module 312 generates and maintains an overall view of storage system 100, herein termed a cell view, that includes information about nodes 102A-102n present in the cell and about which node is the currently acting master node.

Based on changes to the cell view, node management module 312 can independently start a recovery process to reconstruct data stored on a failed node 102B-102n or stored on a failed storage structure of locally attached storage device 106A.

In the present embodiment, node management module 312 includes a monitoring function and a management function. Node management module 312 monitors modules 302, 304, 306, 308, and 310 to gather information about the operational status of node 102A and storage system 100.

Node management module 312 has hooks, i.e., communication links, into interface module 304, disklet module 306, metadata module 308, and object archive module 310 to monitor each module in node 102A. Node management module 312 also communicates with core module 302 and monitors core module 302 for any events, such as error codes generated during the monitoring of the hardware. In the event core module 302 does not have the capability to perform hardware monitoring and event generation, node management module 312 includes mechanisms that permit it to assume these functions.

The monitoring function of node management module 312 generates events, as needed, that the management function acts on. The management function of node management module 312 includes response strategies for responding to different events, such as error codes, and executes the response strategies based on the event, for example, harvesting data, and rebooting a node, among others.

In one embodiment, the monitoring of modules 302, 304, 306, 308 and 310 is implemented using a near stateless communication process termed a shared mailbox, also conventionally termed a distributed mailbox, hints, or heartbeats. In shared mailbox communications each module 302, 304, 306, 308, 310, and 312 sends a "heartbeat" that indicates its status at a designated interval or time. Each module 302, 304, 306, 308, 310, and 312 does not have to be individually queried as to its status, but rather the "heartbeats" are monitored for any changes that require a response to be generated. Thus, each module 302, 304, 306, 308, and 310 is generally able to maintain its status without having to lock on to any particular process to provide its status. In one embodiment, the "heartbeat" of node management module 312 is monitored by a node management module of another node. For example, the "heartbeat" of node management module 312 in node 102A is monitored by a node management module in node 102B.

As earlier described, node management module 312 communicates with core module 302 and monitors core module 302 for any events, such as error codes generated during the monitoring of the hardware. In one embodiment, core module 302 includes information about the hardware of node 102A, such as the number, types, and layout of disks, the number and types of communication channels, processor 202, and network interface(s) 212. In one embodiment, core module 302 includes mechanisms to check the hardware of node 102A for errors, such as disk errors, and to generate events for communication to node management module 312. In the event core module 302 cannot check the hardware of node 102A, node management module 312 includes mechanisms to assume these functions.

Core module 302 also includes information about the operating system and other applications utilized on storage system 100 on node 102A. For example, referring to node 102A (FIG. 2), core module 302 includes information about operating system 206, virtual machine platform 208, and file management system 210. In some embodiments, core module 302 monitors operating system 206, virtual machine platform 208, and file management system 210.

Additionally, core module 302 includes a series of drivers that allow instructions to be passed between symmetric storage system application 104 and the hardware of node 102A.

In one embodiment, interface module 304 provides an internet protocol and overarching application program interface (API) to access storage system 100. In one embodiment, the internet protocol is Hypertext Transfer Protocol (HTTP), however in other embodiments, other protocols can be used. In one embodiment, the API is a Java API, however in other embodiments, other APIs can be used.

Interface module 304 receives requests to store, e.g., write, read, and operate on data on storage system 100. Interface module 304 receives any metadata provided with data to be stored on storage system 100. Interface module 304 also receives disklets for storage and execution on storage system 100.

In one embodiment, disklet module 306 manages disklets stored and executing on storage system 100. A disklet is code, e.g., an application, written by a user against a disklet API, such as a Java API, for storage and execution on storage system 100. In one embodiment, the disklet is precompiled code, such as Java byte code. In one embodiment, a disklet is developed on a user's system, such as computer systems 114 or 116, and uploaded to storage system 100.

The disklet is stored on storage system 100 and a handle to the disklet is generated by disklet module 306 and returned to the user. The user uses the handle in a request to execute the disklet using data that is stored on, being read from, or being written to storage system 100. Thus, a disklet is executed on storage system 100 and the results returned to the user (if so desired). Thus, data does not have to first be retrieved and transferred to the user in order to execute the application.

In one embodiment, disklet module 306 also implements disklet security to prevent disklets from inadvertently or maliciously damaging storage system 100. In one embodiment, Java sandboxing is used to set limits on what operations a disklet can perform and to externally limit the amount of processing and memory a disklet can consume.

In one embodiment, a new disklet is first read by a security application of disklet module 306 that determines whether the disklet is approved for use on storage system 100. In one embodiment, an approved disklet is identified as approved, e.g., signed, and allowed to be used on storage system 100. A non-approved disklet is not identified as approved, e.g., not signed, and can be deleted, quarantined, or processed for further security evaluation. In some embodiments, a notification is generated advising a user that a disklet is not approved.

In one embodiment, object archive module 310 distributively stores, retrieves, and reconstructs data objects in storage system 100. Retrieval and reconstruction of data objects in storage system 100 is based upon the mechanism of storage implemented by object archive module 310.

In storing a data object, object archive module 310 determines placement, fragmentation, and storage of a data object. During placement, object archive module 310 receives a data object and determines a set of storage structures, such as storage disks, to be used in distributively storing fragments of the data object, including data fragments and parity fragments.

In one embodiment, object archive module 310 generates a random, and reproducible, layout map identifier (ID) that is assigned to the data object. While non-random layout map IDs may be used, assignment of randomized layout map IDs allows data objects to be evenly distributed among storage structures of locally attached storage 106A-106n in storage system 100, even if some of nodes 102A-102n are removed or added.

The layout map ID is used to generate a layout map which represents possible distributed layouts for that data object in storage system 100 based on the current availability of storage structures, for example storage disks, in locally attached storage 106A-106n. In one embodiment, object archive 310 maintains a current view of the available storage structures in storage system 100, herein termed a disk mask, for use in generating layout maps. In one embodiment, a layout map indicates an initial distribution, or initial layout, of fragments for a data object in selected storage structures of one or more of locally attached storage 106A-106n, as well as alternative locations for fragments, such as when a storage structure in the initial layout fails or otherwise becomes unavailable or when a previously unavailable storage structure becomes available.

Figure 4:
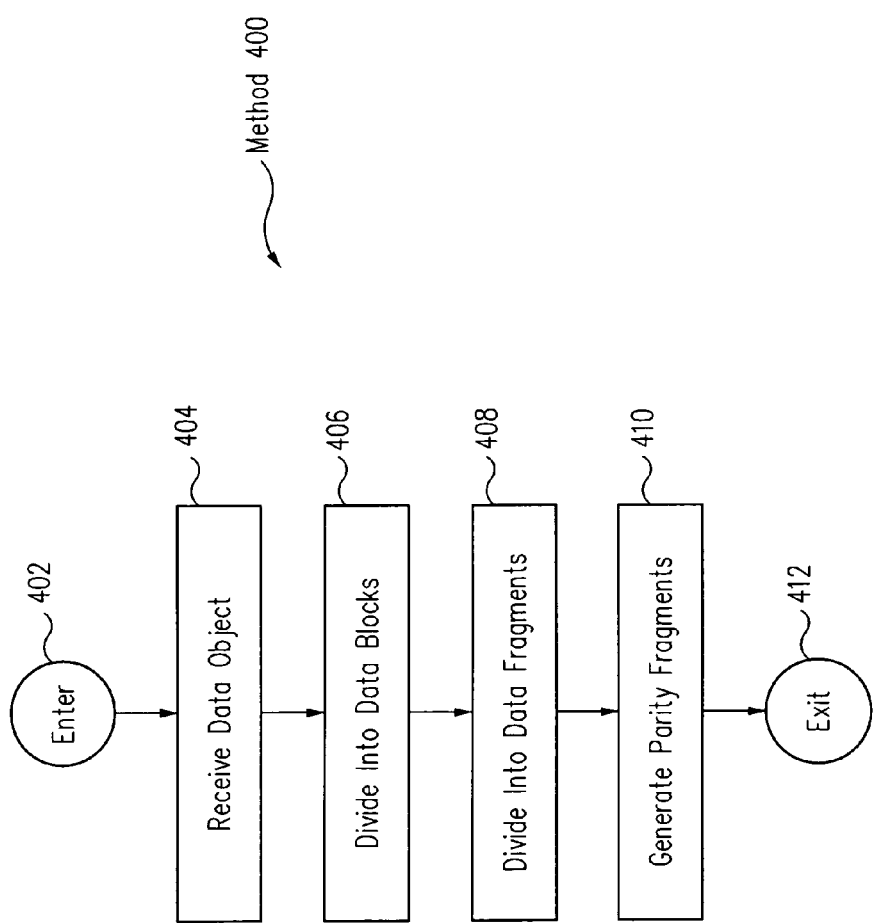
FIG. 4 illustrates a process flow diagram of a method for dividing a data object into data fragments with the generation of parity fragments in accordance with one embodiment of the invention.
Figure 5:
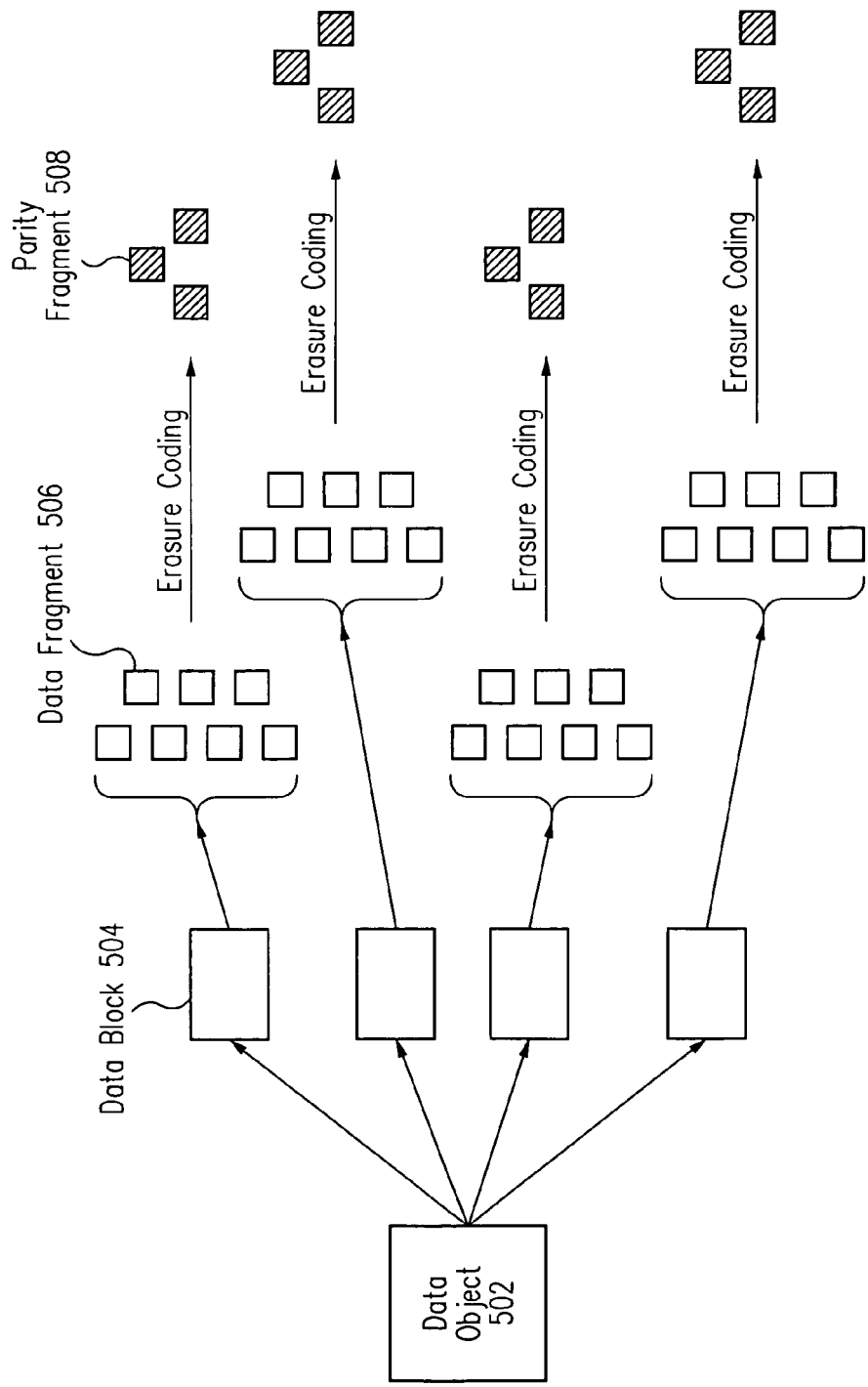
FIG. 5 illustrates the method of FIG. 4 in accordance with one embodiment of the invention.

In fragmentation of a data object, in one embodiment, object archive module 310 divides the data object into data fragments and further generates parity fragments as further described herein with reference to FIGS. 4 and 5.

FIG. 4 illustrates a process flow diagram of a method 400 for dividing a data object into data fragments with the generation of parity fragments in accordance with one embodiment of the invention. FIG. 5 illustrates method 400 in accordance with one embodiment of the invention. In one embodiment, method 400 (FIG. 4) is implemented by object archive module 310 (FIG. 3) of symmetric storage system application 104 (FIG. 2). Referring initially to FIG. 4, in one embodiment, from an ENTER operation 402, flow transfers to a RECEIVE DATA OBJECT operation 404.

In RECEIVE DATA OBJECT operation 404, referring now to FIGS. 3, 4, and 5, object archive module 310 receives a data object 502 for storage in storage system 100 (FIG. 1). In one embodiment, object archive module 310 generates a unique object identifier (ID) for the data object. In one embodiment, the object ID is generated based upon an intrinsic property of the data object. In one embodiment, the object ID is generated based upon the content of the data object.

In one embodiment, object archive module 310 generates the object ID for data object 502 using an SHA-1 hash of the data object contents. In other embodiments, the object ID can be generated based upon other intrinsic properties of the data object that result in a unique object ID. Uniquely identifying a data object based on its content or other intrinsic property of the data object, enables the unique identifier, e.g., the object ID, to be used as an identifier of the data object in storage system 100 and provides content addressability. Upon receipt of data object 502 and generation of the object ID, flow transitions from RECEIVE DATA OBJECT operation 404 to a DIVIDE INTO DATA BLOCKS operation 406.

In DIVIDE INTO DATA BLOCKS operation 406, object archive module 310 divides data object 502 into one or more data blocks 504. Herein a data block is a portion of a data object, such as a logical data size that operating system 206 uses to read or write files, for example, 384 KB. In one embodiment, based on the object ID, any of data blocks 504 can be distributed to any of the other nodes 102B-102n in storage system 100 and the remainder of method 400 performed at those other nodes 102B-102n. Upon division of data object 502 into data blocks 504, flow transitions from DIVIDE INTO DATA BLOCKS operation 406 to a DIVIDE INTO DATA FRAGMENTS operation 408.

In DIVIDE INTO DATA FRAGMENTS operation 408, object archive module 310 divides each of data blocks 504 into one or more data fragments 506. Herein a data fragment is a portion of a data block, such as 64 KB on disk. Upon division of each of data blocks 504 into data fragments 506, flow transitions from DIVIDE INTO DATA FRAGMENTS operation 408 to a GENERATE PARITY FRAGMENTS operation 410.

In GENERATE PARITY FRAGMENTS operation 410, object archive module 310 applies an erasure coding algorithm, such as a Reed-Solomon erasure coding algorithm, to data fragments 506 from each of data blocks 504 to generate one or more parity fragments 508. In one embodiment, any parity fragment 508 can be used to generate any data fragment 506 of data block 504 of data object 502. In one embodiment, the erasure coding algorithm utilizes an external criterion, such as a desired reliability of storage, in generating parity fragments 508. Upon generation of parity fragments 508, flow transitions from GENERATE PARITY FRAGMENTS operation 410 and exits method 400 at an EXIT operation 412.

In an alternative embodiment, object archive module 310 divides data object 502 directly into data fragments 506 and the erasure coding algorithm is applied to data fragments 506 to generate parity fragments 508, e.g., operation 406 is not performed. Although division of data object 502 into data blocks 504 is not a required intermediate operation to division of data object 502 into fragments 506, it enables parallelization of operations 408 and 410 by enabling data blocks 504 to be distributed to other nodes 102B-102n where the generation of data fragments 506 and parity fragments 508 can occur.

Following generation of the data fragments and parity fragments (method 400), object archive module 310 stores the data fragments of the data object and the parity fragments associated with the data object to one or more storage structures, e.g., storage disks, in storage system 100, in accordance with the layout map associated with the data object. In one embodiment, object archive 310 periodically evaluates the storage structures in locally attached storage 106A, for example by checking disk segments of disks, and reporting problems to node management module 312 (FIG. 3).

During placement, fragmentation, and storage of a data object, object archive module 310 also generates metadata associated with the data object. Metadata is data that provides a description of a data object stored in storage system 100, and is used to perform searches and retrieve data in storage system 100. In particular, object archive module 310 generates system metadata which is metadata that is stored, e.g., encapsulated, as part of each of the data fragments and parity fragments of that data object.

In one embodiment, system metadata includes information that is utilized by object archive module 310 to retrieve and reconstruct a data object once a data fragment of that data object is located. Examples of system metadata include number of data fragments, number of parity fragments, the layout for a data object, the data fragment length, the size of a data object, and the create time for a data object. System metadata generated by object archive module 310 are also provided to metadata module 308.

In one embodiment, metadata module 308 receives metadata from metadata generators, such as an object archive, e.g., object archive module 310, a client, e.g., a client application program interface (API), or a disklet, e.g., an executing disklet. In one embodiment, as earlier described with reference to object archive module 310, metadata received from object archive module 310 is termed system metadata. Other metadata, such as metadata received from a client or generated in accordance with disklet, is termed extended metadata.

Extended metadata received by metadata module 308 is passed to object archive 310 for distributed storage on storage system 100. In one embodiment, metadata module 308 computes a deterministic layout map identifier, herein termed a metadata layout map ID, and provides the metadata layout map ID to object archive module 310.

Object archive module 310 determines the placement of the metadata based on the metadata map ID. In one embodiment, object archive module 310 uses the metadata layout map ID to generate a metadata layout map for storing the metadata. Object archive module 310 fragments the metadata similar to a data object as earlier described with reference to FIGS. 4 and 5 with resultant metadata data fragments and metadata parity fragments. Following generation of the metadata data fragments and metadata parity fragments, object archive module 310 stores the metadata data fragments and the metadata parity fragments to one or more storage structures, e.g., disks, in storage system 100, in accordance the metadata layout map.

In one embodiment, metadata module 308 further indexes selected metadata, e.g., selected from the system metadata and/or extended metadata, into one or more metadata caches. In one embodiment, each metadata cache is a relational database of selected metadata. In one embodiment, each metadata cache is extensible.

The metadata caches are distributively stored on storage system 100 and used to enhance searching and retrieval of data objects on storage system 100, e.g., by searching the metadata caches rather than the object archive.

Figure 6:
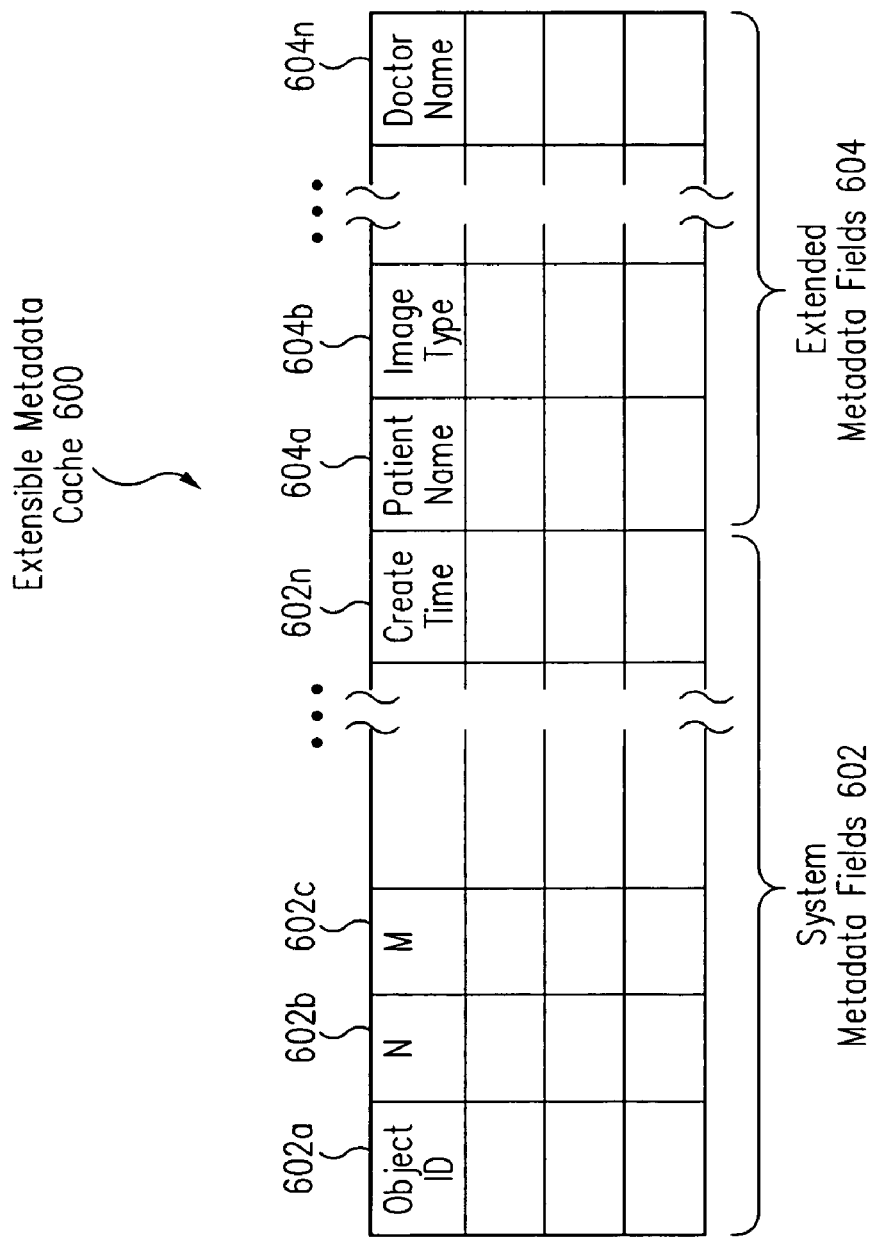
FIG. 6 illustrates a block diagram of an extensible metadata cache in accordance with one embodiment of the invention.

FIG. 6 illustrates a block diagram of an extensible metadata cache 600 in accordance with one embodiment of the invention. In FIG. 6, extensible metadata cache 600 includes system metadata fields 602, such as system metadata fields 602A-602n, and extended metadata fields 604, such as extended metadata fields 604A-604n. For example, system metadata fields 602A-602n can include: an object ID field 602A (an object. ID of a data object); an "IN" field 602B (number of data fragments); an "M" field 602C (number of parity fragments; and a size field 602n (size of a data object). Extended metadata fields 604A-604n, such as for those metadata generated in response to execution of a disklet on storage system 100, can include: a patient name field 604A; an image type field 604B; and a doctor name field 604n. In one embodiment, the number of extended metadata fields is definable by a system administrator of storage system 100.

In one embodiment, the metadata caches generated by metadata module 308 can be replicated on any of nodes 102A-102n to provide a desired reliability. The metadata caches are scalable with the size of storage system 100 and can be distributed across nodes 102A-102n. In some embodiments, metadata module 308 can further generate metadata caches associated with selected parameters of a data object, such as a type of data object, or with a particular metadata generator.

In one embodiment, symmetric storage system application 104 can be configured as a computer program product. Herein a computer program product comprises a medium configured to store or transport computer-readable instructions, such as program code for symmetric storage system application 104, including all, any, or parts of processes described herein with reference to FIGS. 1-6, or in which computer-readable instructions for symmetric storage system application 104, including all, any, or parts of processes described herein with reference to FIGS. 1-6 are stored. Some examples of computer program products are CD-ROM discs, ROM cards, floppy discs, magnetic tapes, computer hard drives, servers on a network and signals transmitted over a network representing computer-readable instructions. Further herein, a means for performing a particular function is accomplished using the appropriate computer-readable instructions and the related hardware necessary to perform the function.

As described above, storage system 100 provides data storage reliability through flexible, software management of data object storage on nodes 102A-102n. Each of nodes 102A-102n is a field replaceable unit allowing storage system 100 to be easily scaled with data storage requirements.

A data object is distributively stored on storage system 100 in accordance with a layout map generated from a layout map ID and using a unique object ID based on an intrinsic property of the data object, such as the content of the data object, thus providing content addressability. Once stored, a data object is not modifiable.

A data object is stored in a flexible manner on nodes 102A-102n according to external criteria, such as a desired reliability of storage.

Metadata associated with a data object is generated during storage of a data object and distributively stored on storage system 100. At least a portion of metadata generated during storage of a data object is stored with each data fragment and parity fragment of the data object.

Metadata caches of selected metadata that are indexed to data objects are stored on storage system 100 and used in search and retrieval of data objects.

Disklets can be uploaded and executed on system 100 against data objects that are stored on, being written to, or being read from storage system 100 to generate results accessible by a user.

The foregoing description of implementations of the invention have been presented for purposes of illustration and description only, and, therefore, are not exhaustive and do not limit the invention to the precise forms disclosed. Modifications and variations are possible in light of the above teachings or can be acquired from practicing the invention. Consequently, Applicants do not wish to be limited to the specific embodiments shown for illustrative purposes.

What is claimed is:

1. A data storage system comprising:
   a storage system network; and
   one or more peer node computer systems interconnected by said storage system network, each of said one or more peer node computer systems comprising:
   a memory, the memory storing instructions associated with a computing system implemented process for providing a symmetric storage system;
   a processor, the processor executing at least some of the instructions associated with the computing system implemented process for providing a symmetric storage system;
      said computing system implemented process for providing a symmetric storage system comprising:
         providing an interface module;
         providing a node management module connected with said interface module;
         providing a core module connected with said node management module;
         providing a disklet module connected with said node management module;
         providing a metadata module connected with said node management module; and
         providing an object archive module connected with said node management module, and
      providing a locally attached storage associated with said computing system implemented process for providing a symmetric storage system;
   wherein the processor executes at least some of the instructions associated with the computing system implemented process for providing a symmetric storage system such that at least one data object is distributively stored on one or more of said one or more peer node computer systems, and
   further wherein said at least one data object is accessed by any of said one or more peer node computer systems.

2. The data storage system of claim 1, wherein said at least one data object is identified using a unique identifier generated by said computing system implemented process for providing a symmetric storage system and based on an intrinsic property of said data object.

3. The data storage system of claim 2, wherein said intrinsic property is a content of said at least one data object.

4. The data storage system of claim 3, wherein said unique identifier is generated using a hashing algorithm on said content.

5. The data storage system of claim 4, wherein said hashing algorithm is an SHA-1 hashing algorithm.

6. The data storage system of claim 2, wherein said at least one data object is further stored according to at least one external criterion.

7. The data storage system of claim 6, wherein said at least one external criterion is a specified level of reliability of storage of said at least one data object on said data storage system.

8. The data storage system of claim 1, said data storage system further for executing at least one disklet.

9. The data storage system of claim 8, wherein said at least one disklet is uploaded to and stored on said data storage system.

10. The data storage system of claim 9, wherein a handle to said at least one disklet is generated and returned, said handle identifying said at least one disklet on said data storage system.

11. The data storage system of claim 9, wherein said at least one disklet is executed on said data storage system using said at least one data object stored on said data storage system.

12. The data storage system of claim 9, wherein said at least one disklet is executed on said data storage system using at least one data object being written to said data storage system.

13. The data storage system of claim 9, wherein said at least one disklet is executed on said data storage system using at least one data object being read from said data storage system.

14. The data storage system of claim 1, further comprising:
   a switch, wherein said switch is configured to support communications between said one or more peer node computer system on said storage system network and between said storage system network and an external network.

15. The data storage system of claim 14, wherein said switch is configured to present a virtual internet protocol (IP) address for external network access to said data storage system and an administrative internet protocol (IP) address to permit access to said data storage system for system administration.

16. The data storage system of claim 14, wherein each of said one or more external computer systems includes a client application program interface (API) comprising a load spreading mechanism, and
   further wherein access to said one or more peer node computer systems by each of said one or more external computer systems is determined in accordance with said load spreading mechanism.

17. The data storage system of claim 15, wherein said switch comprises a load spreading mechanism, and
   further wherein access to said one or more peer node computer systems by each of said one or more external computer systems is determined in accordance with said load spreading mechanism.

18. The data storage system of claim 1, wherein control of said data storage system is by a master node, wherein said master node is elected from said one or more peer node computer systems.

19. The data storage system of claim 1, wherein said computing system implemented process for providing a symmetric storage system divides at least one data object into one or more data fragments and one or more parity fragments, said one or more data fragments and said one or more parity fragments being distributively stored on one or more of said locally attached storage.

20. The data storage system of claim 19, wherein said computing system implemented process for providing a symmetric storage system divides said at least one data object into one or more data blocks, and further wherein said computing system implemented process for providing a symmetric storage system divides each of said one or more data blocks into one or more data fragments.

21. The data storage system of claim 19, wherein said computing system implemented process for providing a symmetric storage system applies an erasure coding algorithm to said one or more data fragments to generate said one or more parity fragments.

22. The data storage system of claim 21, wherein said erasure coding algorithm is a Reed-Solomon erasure coding algorithm.

23. The data storage system of claim 22, wherein said erasure coding algorithm is based upon a desired level of storage reliability of said at least one data object on said data storage system.

24. The data storage system of claim 19, wherein said computing system implemented process for providing a symmetric storage system generates a unique identifier of said at least one data object based on an intrinsic property of said data object.

25. The data storage system of claim 19, wherein said computing system implemented process for providing a symmetric storage system generates system metadata associated with said data object.

26. The data storage system of claim 25, where at least a portion of said system metadata is stored with each of said one or more data fragments and said one or more parity fragments.

27. The data storage system of claim 1, wherein metadata associated with said at least one data object is distributively stored on one or more of said one or more peer node computer systems.

28. The data storage system of claim 27, wherein said metadata includes system metadata generated by said computing system implemented process for providing a symmetric storage system.

29. The data storage system of claim 27, wherein said metadata includes extended metadata received with said at least one data object.

30. The data storage system of claim 27, wherein said metadata includes extended metadata generated by a disklet.

31. The data storage system of claim 1, further comprising one or more metadata caches.

32. The data storage system of claim 1, wherein said locally attached storage comprises:

one or more storage structures.

* * * * *